US012125351B1

(12) United States Patent
Goetz et al.

(10) Patent No.: US 12,125,351 B1
(45) **Date of Patent: *Oct. 22, 2024**

(54) SYSTEMS AND METHODS FOR A NIGHT DROP SYSTEM

(71) Applicant: Wells Fargo Bank, N.A., San Francisco, CA (US)

(72) Inventors: Darren M. Goetz, Salinas, CA (US); Chris Kalaboukis, San Jose, CA (US); Lisa R. Magana, San Francisco, CA (US); Andrew L Martinez, San Francisco, CA (US); Uma Meyyappan, Freemont, CA (US); Dennis E. Montenegro, Concord, CA (US); Marla M. Pacis, Daly City, CA (US); Timothy R. Ward, Mesa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,797

(22) Filed: Nov. 21, 2022

Related U.S. Application Data

(63) Continuation of application No. 17/325,478, filed on May 20, 2021, now Pat. No. 11,508,221, which is a continuation of application No. 16/177,788, filed on Nov. 1, 2018, now Pat. No. 11,017,640.

(51) Int. Cl.
*G07F 19/00* (2006.01)
*G07C 9/00* (2020.01)

(52) U.S. Cl.
CPC ....... *G07F 19/206* (2013.01); *G07C 9/00912* (2013.01); *G07F 19/202* (2013.01)

(58) Field of Classification Search
CPC .. G07F 19/206; G07F 19/202; G07C 9/00912
See application file for complete search history.

(56) References Cited

U.S. PATENT DOCUMENTS

| | | | | |
|---|---|---|---|---|
| 7,295,110 | B2 * | 11/2007 | Mercier | G07F 17/13 340/568.1 |
| 9,406,187 | B2 | 8/2016 | Hammonds et al. | |
| 9,745,130 | B1 | 8/2017 | Rawal | |
| 9,811,784 | B2 | 11/2017 | Wan et al. | |
| 11,017,640 | B1 * | 5/2021 | Goetz | G07F 19/202 |

(Continued)

*Primary Examiner* — Sonji N Johnson
(74) *Attorney, Agent, or Firm* — Foley & Lardner LLP

(57) ABSTRACT

Systems and methods relating to a lockbox bank for currency drop-offs are provided. A lockbox bank includes one or more lockboxes, a safe coupled to the one or more lockboxes, and a terminal of a lockbox computing system. Each lockbox includes a receptacle configured to receive a currency drop-off and a locking mechanism. The terminal includes a network interface, a display device, one or more input/output devices, and a processing circuit including a processor and a memory. The memory is structured to store instructions that are executable by the processor and cause the processing circuit to receive a request from the customer to use a lockbox for a currency drop-off, receive access credentials, verify the access credentials, in response to successful verification, grant the customer access to a lockbox, and in response to determining that the drop-off has been completed, move the drop-off from the receptacle to the safe.

18 Claims, 10 Drawing Sheets

(56) References Cited

U.S. PATENT DOCUMENTS

| | | | | |
|---|---|---|---|---|
| 11,508,221 | B1 * | 11/2022 | Goetz | G07C 9/00912 |
| 2010/0082151 | A1 * | 4/2010 | Young | G06Q 10/083 700/226 |
| 2014/0304156 | A1 * | 10/2014 | Geller | G06Q 40/04 705/43 |
| 2016/0358124 | A1 * | 12/2016 | Crane | G06Q 20/18 |
| 2017/0046896 | A1 | 2/2017 | Schroader et al. | |
| 2018/0046978 | A1 * | 2/2018 | Tartal | G06Q 20/203 |
| 2018/0197140 | A1 | 7/2018 | Goja | |
| 2018/0247481 | A1 | 8/2018 | Gilbertson et al. | |
| 2019/0231467 | A1 | 8/2019 | Grimsley et al. | |
| 2020/0077826 | A1 | 3/2020 | Chenier | |
| 2020/0151662 | A1 | 5/2020 | Estill | |

* cited by examiner

SYSTEMS AND METHODS FOR A NIGHT DROP SYSTEM

CROSS-REFERENCE TO RELATED PATENT APPLICATIONS

This application is a continuation of U.S. patent application Ser. No. 17/325,478, filed May 20, 2021 and entitled "Systems and Methods for a Night Drop System," which is a continuation of U.S. patent application Ser. No. 16/177,788, filed Nov. 1, 2018 and entitled "Systems and Methods for a Night Drop System," each of which is incorporated herein by reference in its entirety.

BACKGROUND

Providers of banking services provide a plethora of financial services to customers to assist in the completion of transactions and to meet the needs of the customers. One service includes assisting with transactions that involve "in-hand" funds, for example, the withdrawal or deposit of cash. Currently, a customer may engage in the withdrawals and deposits of these funds by walking into a branch location of a provider and initiating the withdrawal or deposit request via interaction with a teller at the branch. However, the customer is only able to access the provider during operating hours, which are usually between the hours of 9 AM to 5 PM. Many customers may find these hours inconvenient and in conflict with their work schedules, requiring them to leave a job during the work day to complete the desired transaction. Some provider branch locations may offer an afterhours drop-box deposit service, but this is limited to availability and requires the customer to travel to a branch location that offers the service, the location possibly being far away from the customer's location. While a provider may have automated teller machines ("ATMs") in various locations outside of a branch location to allow the customer, at any hour of the day, to withdraw cash after authenticating at the ATM, the type of transactions may not allow large withdrawals or deposits.

SUMMARY

One embodiment relates to a lockbox bank. The lockbox bank includes one or more lockboxes. Each lockbox includes a receptacle configured to receive a currency drop-off and a locking mechanism. The lockbox bank further includes a safe coupled to the one or more lockboxes and a terminal of a lockbox computing system. The terminal of the lockbox computing system includes a network interface configured to communicate with a computing system associated with a provider of financial services, a display device configured to present information to a customer, one or more input/output devices configured to exchange data with the customer, and a processing circuit. The processing circuit includes a processor and a memory, the memory structured to store instructions that are executable by the processor. The instructions cause the processing circuit to receive, by the network interface or the one or more input/output devices, a request from the customer to use one of the one or more lockboxes for a currency drop-off; receive, by the one or more input/output devices, access credentials from the customer; and verify the access credentials. The instructions further cause the processing circuit to, in response to successful verification of the access credentials, grant the customer access to a lockbox by unlocking the locking mechanism of the lockbox and, in response to determining that the drop-off has been completed, move the drop-off from the receptacle of the lockbox to the safe.

Another embodiment relates to a method. The method includes receiving, at a lockbox computing system associated with a lockbox bank, the lockbox bank including one or more lockboxes coupled to a safe, each of the one or more lockboxes including a receptacle configured to receive a currency drop-off and a locking mechanism, a request from a customer to use one of the one or more lockboxes for a currency drop-off. The method also includes receiving, by the lockbox computing system, access credentials from the customer and verifying, by the lockbox computing system, the access credentials. The method further includes, in response to successful verification of the access credentials, granting, by the lockbox computing system, the customer access to a lockbox by unlocking the locking mechanism of the lockbox and, in response to determining that the drop-off has been completed, moving, by the lockbox computing system, the drop-off from the receptacle of the lockbox to the safe.

Another embodiment relates to a lockbox bank. The lockbox bank includes one or more lockboxes. Each lockbox includes a receptacle configured to receive a currency drop-off, a locking mechanism, and a weight sensor. The lockbox bank also includes a safe coupled to the one or more lockboxes and a terminal of a lockbox computing system. The terminal of the lockbox computing system includes a network interface configured to communicate with a computing system associated with a provider of financial services, a display device configured to present information to a customer, one or more input/output devices configured to exchange data with the customer, and a processing circuit. The processing circuit includes a processor and a memory, the memory structured to store instructions that are executable by the processor. The instructions cause the processing circuit to receive, by the network interface or the one or more input/output devices, a request from a customer to use one of the one or more lockboxes for a currency drop-off; receive, by the one or more input/output devices, access credentials from the customer; and verify the access credentials. The instructions also cause the processing circuit to, in response to successful verification of the access credentials, grant the customer access to a lockbox by unlocking the locking mechanism of the lockbox; receive a weight of the drop-off from the weight sensor of the lockbox; determine whether the weight of the drop-off matches an expected weight of the drop-off; and transmit a notification to the customer indicating whether the weight of the drop-off matches the expected weight. The instructions further cause the processing circuit to move the drop-off from the receptacle of the lockbox to the safe.

DETAILED DESCRIPTION

Figure 1:
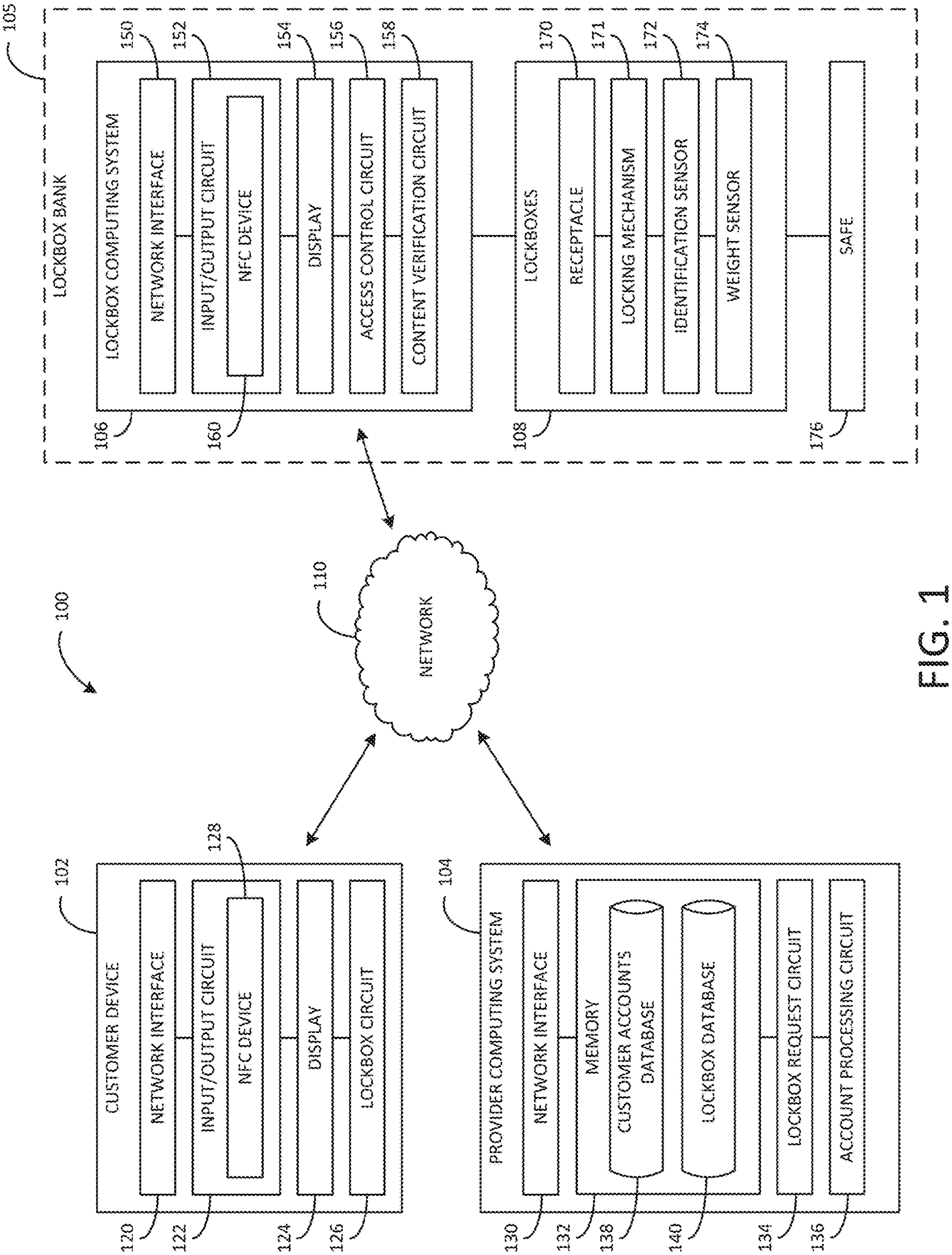
FIG. 1 illustrates a schematic diagram of a lockbox drop-off transaction processing system, according to an example embodiment.

Referring generally to the figures, systems, and methods for depositing currency (e.g., U.S. dollars, Euros, yen, etc.) via a lockable box drop-off service are described. "Lockable boxes," also referred to herein as "lockboxes," include locking receptacles configured to receive, for example, currency dropped off by a customer. Lockboxes can be provided in a variety of shapes and configurations, such as a traditional grid of rectangles when viewed from the front but also hexagons, octagons, circles, triangles, shapes conducive for stacking, shapes conducive for aligning, and shapes that fit in with other lockboxes to form an overall shape or design. Additionally, lockboxes include lockable cubbies, lockers, compartments, cabinets, drawers, bins, baskets, boxes, caddies, capsules, cartridges, shells, chests, trunks, canisters, cubes, cubicles, cells, and the like. Lockboxes can be provided at a variety of locations, such as a branch of a bank, a mall, a parking lot, a student union, and the like.

According to the systems and methods described herein, a customer holds one or more accounts (e.g., one or more demand deposit accounts, such as a debit account or a savings account) with a provider of financial accounts. The customer brings an amount of currency to a bank of one or more lockboxes associated with the provider with the intention of dropping off the currency in one of the lockboxes. As an illustration, a customer owns a business and brings currency that customers have used to make purchases over one or more business days for deposit to the customer's account. In some arrangements, the lockboxes are configured to be accessible by customers at night (e.g., after regular business hours are over). In one example, the lockboxes are configured to be accessible between 6 AM and 12 AM. In another example, the lockboxes are configured to be accessible 24 hours a day. As such, a customer who, for example, owns a business and must be present at the business during regular business hours can bring currency payments made to the business for deposit after the customer has closed the business for the day. In some arrangements, the customer arranges the lockbox drop-off beforehand (e.g., such that the customer is provided with an order number for the drop-off). In other arrangements, the customer drops off the currency at a lockbox without any prior arrangement by the customer.

Once at a bank of one or more lockboxes, the customer accesses the lockbox using access credentials. For example, the customer provides the access credentials to a terminal of a computing system associated with the lockbox bank (e.g., a "lockbox computing system"). Depending on the embodiment, access credentials include an order number that the customer provides to the terminal, a near field communication ("NFC") tap the customer performs with the terminal using the customer's phone, a password or personal identification number ("PIN") that the customer provides to the terminal, and so on. The lockbox computing system then verifies whether the access credentials are correct, and if they are, the lockbox terminal grants the customer access to a lockbox for the purposes of making the drop-off. Alternatively, in some arrangements, the customer does not provide access credentials to access the lockbox and instead simply indicates to the terminal that the customer has currency to be dropped off at a lockbox. The lockbox computing system then grants the customer access to a lockbox.

Once the customer has access to a lockbox, the customer drops off the currency at the lockbox. The customer then closes the lockbox, which automatically relocks. Once the currency is in the lockbox, in some embodiments, the lockbox and/or the lockbox computing system performs one or more actions to confirm the drop-off. As an illustration, in some arrangements, the lockbox includes a weight sensor that weighs the currency that has been dropped off. The lockbox computing system determines whether the weight of the currency is approximately equal (e.g., within a certain amount of error) to an amount specified by the customer beforehand as corresponding to the currency drop-off. The lockbox computing system then performs one or more actions based on whether the weight matches the approximate weight, such as sending a notification to the customer who arranged the drop-off indicating that the drop-off has been completed and that the weight of the currency appears to match the specified amount. As another illustration, the lockbox computing system identifies or verifies the customer making the currency drop-off. As an example, the drop-off is made using a bag with an NFC device or a radio frequency identification ("RFID") device configured to transmit a code associated with the customer. The lockbox contains an NFC or RFID device to receive the code, and the lockbox computing system is configured to verify, based on the transmitted code, which customer the drop off is for. As another example, the lockbox bank includes a camera, and the lockbox computing system is configured to use facial recognition software to identify the customer making the drop-off from the camera.

After the lockbox and/or the lockbox computing system performs the specified actions, if any, the lockbox bank is configured to move the drop-off to a more secure location. In one example, the bottom of the lockbox is configured to slide back or down, and the drop-off falls into a safe located below the lockbox. In another example, the back of the lockbox is connected to a chute that leads to a safe. The lockbox is thus configured to move the drop-off into the chute (e.g., by a back panel of the lockbox sliding away and a bottom panel of the lockbox sloping upward such that the drop-off slides into the chute), at which point the drop-off slides down the chute and into the safe. By moving the drop-off to a more secure location after the drop-off is completed, the lockbox can be used by another customer for a different drop-off, thereby decreasing the number of lockboxes needed at a single location. Moreover, in this way, the drop-offs are moved to a single, secure location to be picked up, for example, by an armored courier or an employee of the provider associated with the lockbox bank.

At some point after the drop-off occurs, an employee of the account provider verifies the amount of currency that was dropped off. The customer's account is then credited with the verified amount of currency.

The systems and methods described herein provide a number of technical advantages over present systems and methods for depositing currency. To begin with, as noted above, many customers are unable to make deposits of currency during the normal operating hours of a provider of financial accounts. While locations for night deposits exist, they can often be located far away from the customer. The present systems and methods provide for banks of lockboxes that can be accessed outside of regular business hours for deposits and can be provided at a variety of locations, thereby allowing customers to more easily make currency deposits. Moreover, these lockbox banks are configured to move currency drop-offs to secure locations, such as safes, allowing for better security of the deposit and customer confidence in the deposit system. Additionally, as noted above, the ability to move deposits from lockboxes to secure locations decreases the number of lockboxes that must be provided at a single location to serve the desired number of customers. The secure location also allows for drop-offs to be easily verified and picked up, for example, for transport to the account provider.

Additionally, some customers are unable to make deposits personally and may send, for example, an employee to make a currency drop-off. In these cases, the customer may worry that the deposit was made incorrectly or that the employee may have taken some of the currency before making the drop-off. However, according to the some of the embodiments described herein, a computing system associated with the lockbox used for a drop-off performs one or more actions to verify the drop-off. In one example, as described above, the customer specifies the amount or the approximate amount of currency in the drop-off. Once the drop-off is made, the lockbox weighs the drop-off, and the lockbox computing system verifies that the weight matches an expected weight for the amount of currency specified by the customer for the drop-off. The lockbox computing system then provides a notification to the customer confirming that the drop-off has occurred and that the amount included in the drop-off appears to be correct. As such, the customer is given peace of mind that the drop off occurred correctly.

Referring now to FIG. 1, an environmental view of a lockbox drop-off transaction processing system 100 is shown, according to an exemplary embodiment. The lockbox drop-off transaction processing system 100 includes a customer device 102, a provider computing system 104, and a lockbox bank 105. In turn, the lockbox bank 105 includes a terminal of a lockbox computing system 106 operatively coupled to one or more lockboxes 108 and a safe 176. The customer device 102, provider computing system 104, and lockbox computing system 106 are connected by a secure network (e.g., network 110). In some embodiments, the network 110 includes the Internet, cellular networks, proprietary banking networks, intranets, and the like.

The customer device 102 is associated with a customer holding one or more financial accounts with an account provider. As an example, the customer holds a checking account, a savings account, and/or a business account with an account provider. In various embodiments, the customer device 102 is a stationary or portable (e.g., mobile) computing device. As such, the customer device 102 includes, for example, any of a smartphone, a tablet, a laptop, a desktop computing system, a smart watch, smart glasses, and so on. As shown in FIG. 1, the customer device 102 includes a network interface 120, an input/output circuit 122, a display 124, and a lockbox circuit 126.

The network interface 120 is structured to facilitate operative communication between the customer device 102 and the other components of the system 100. For example, the network interface 120 is structured to facilitate communication between the customer device 102 and the provider computing system 104 and the lockbox computing system 106.

The input/output circuit 122 is configured to receive input from the customer via the customer device 102 and/or provide output to the customer via the customer device 102. In some embodiments, the input/output circuit 122 includes one or more input and/or output devices. In other embodiments, alternatively or additionally, the input/output circuit 122 is configured to receive communications from and/or send communications to one or more other components of the customer device 102. In some arrangements, the customer uses the input/output circuit 122 to provide information about a planned currency drop-off to the provider computing system 104 and/or the lockbox computing system 106. Additionally, in some arrangements, the input/output circuit 122 provides information received from the provider computing system 104 and/or the lockbox computing system 106 regarding a currency drop-off to the customer.

Additionally, as shown in FIG. 1, in some embodiments, the input/output circuit 122 includes an NFC device 128. The NFC device 128 is configured to communicate short-range with a second NFC device once the NFC device 128 and the second NFC device are brought in close contact (e.g., an "NFC tap"). As such, in some embodiments, the customer can use the NFC device 128 to communicate access credentials to the lockbox computing system 106 in order to access a lockbox 108. Alternatively, in other embodiments, the customer device 102 includes a different or additional type of short-range communication device, such as an RFID device. In still other embodiments, the customer device 102 does not include a short-range communication device (e.g., the customer instead accesses the lockbox 108 by providing an order number or passcode to the lockbox computing system 106).

The display 124 is configured to visually present information (e.g., as user interfaces) to the customer. In some embodiments, the display 124 is further configured to receive information from the customer (e.g., through a keyboard provided as part of a touchscreen of the display 124). Additionally, in some arrangements, the display 124 is included in or communicably coupled to the input/output circuit 122.

The lockbox circuit 126 is configured to allow the customer to send and receive information about a currency drop-off. For example, in some embodiments, the lockbox circuit 126 is configured to provide the customer with user interfaces for arranging a lockbox currency drop-off. In other embodiments, the lockbox circuit 126 is alternatively or additionally configured to provide the customer with user interfaces showing the customer information about a planned lockbox drop-off or a completed lockbox drop-off.

The lockbox circuit 126 includes program logic (e.g., stored executable instructions) structured to implement at least some of the functions described herein. In some arrangements, the lockbox circuit 126 is implemented by accessing a website associated with the system 100 via a web browser (e.g., Safari®, Chrome®, Internet Explorer®) structured to receive and display web pages received from the provider computing system 104 and/or the lockbox computing system 106. As an illustration, the customer accesses lockbox services by logging into a provider account using online banking credentials (e.g., a username and password) via a webpage. In other arrangements, the lockbox circuit 126 is implemented as a dedicated application on the customer device 102 (e.g., as a specific lockbox currency drop-off application or as part of a banking application). For example, the lockbox circuit 126 is implemented as an application downloadable from an application store or from a specific website (e.g., a banking website associated with the provider computing system 104). In yet other arrangements, the lockbox circuit 126 is implemented through an existing or generic application, such as a text message application or an email application.

In some embodiments, the customer can arrange a drop-off using the lockbox circuit 126. For example, lockbox circuit 126 displays user interfaces allowing the customer to input information about a planned drop-off, such as the customer account that the customer would like the drop-off credited to, the drop-off amount, the desired drop-off location, and the estimated drop-off time. The lockbox circuit 126 provides that information to the provider computing system 104 and/or the lockbox computing system 106, which then provide confirmation of the drop-off to the customer via the lockbox circuit 126. As an illustration, the lockbox circuit 126 receives and provides to the customer (e.g., via the display 124) a confirmed location of the drop-off and an order number for the drop-off that the customer can use to access the lockbox 108 for the drop-off.

Alternatively or additionally, in some embodiments, the customer can receive information about a planned or completed drop-off via the lockbox circuit 126. In one example, the lockbox circuit 126 is configured to present a notification to the customer confirming that a drop-off has occurred and that a weight of the drop-off matches an estimated weight of the deposit amount. Examples of such a notification include an email, a text message, a pop-up notification, a splash page, and a push notification.

The provider computing system 104 is associated with a provider of financial accounts and services (e.g., demand deposit accounts, credit services, loan services, investment services). For example, in various embodiments, the account provider is a financial institution, such as a bank or a credit union. In the embodiment of FIG. 1, the provider computing system 104 is associated with a provider of one or more accounts for the customer associated with the customer device 102. As shown in FIG. 1, the provider computing system 104 includes a network interface 130, a memory 132, a lockbox request circuit 134, and an account processing circuit 136. Additionally, the memory 132 includes a customer accounts database 138 and a lockbox database 140.

The network interface 130 is structured to facilitate operative communication between the provider computing system 104 and the other components of the system 100. For example, the network interface 130 is structured to facilitate communication between the provider computing system 104 and the customer device 102 and the lockbox computing system 106.

The customer accounts database 138 is structured to retrievably store information related to various customers of the provider. For example, the customer accounts database 138 stores biographical information about various customers (e.g., names, addresses, birthdays, emails, phone numbers), account information about various customers (e.g., account balances, account histories, direct deposit information), template or reference access credentials for various customers (e.g., passwords, PINs, order numbers, biometrics, customer device 102 data), and the like.

The lockbox database 140 is structured to retrievably store information about the one or more lockboxes 108. As examples, the lockbox database 140 retrievably stores information about the locations of the one or more lockboxes 108, lockbox 108 availability, lockbox 108 access hours, and so on. Moreover, in some embodiments, the lockbox database 140 is configured to retrievably store information about lockbox drop-off requests submitted by customers. For example, the lockbox database 140 stores an order number for a lockbox drop-off in association with a customer account to which the drop-off deposit amount will be credited and an amount that the customer indicated would be in the drop-off when the customer set up the drop-off.

The lockbox request circuit 134 is structured to facilitate the back-end process necessary to conduct a lockbox drop-off. Accordingly, the lockbox request circuit 134 is configured to receive and process a customer transaction request to engage in the lockbox drop-off service. Further, the lockbox request circuit 134 is configured to retrieve information about the one or more lockboxes 108 from the lockbox database 140.

In some arrangements, the lockbox request circuit 134 is initiated in response to the customer using the lockbox circuit 126 of the customer device 102 to arrange a lockbox drop-off. For example, if a customer provides a desired time for the drop-off and the customer's current zip code, via the lockbox circuit 126, the lockbox request circuit 134 is configured to determine, by accessing the lockbox database 140, that out of the plurality of lockbox locations near the customer's location, only a certain number are open or available at the customer's desired drop-off time and within a certain distance (e.g., 10 miles) of the customer. As another example, if the customer provides a desired location for the drop-off, the lockbox request circuit 134 is configured to provide the customer with an optimal time for the drop-off (e.g., based on the schedule of other planned drop-offs at that location). As yet another example, if a customer provides a desired time and location for the drop-off, and the lockbox request circuit 134 determines that the requested location is not available at that time, the lockbox request circuit 134 is configured to deny the request or provide the requesting customer with alternative locations or times wherein the drop-off could be completed. In some embodiments, the lockbox request circuit 134 is configured to provide confirmation details about a planned drop-off to the customer. For example, the lockbox request circuit 134 provides an order number to the customer that the customer can use to access a lockbox 108 at the planned location, or the lockbox request circuit 134 provides instructions to the customer for using the customer device 102 to access the lockbox 108.

In other arrangements, the lockbox request circuit 134 is initiated in response to the customer requesting access to a lockbox 108 via the lockbox computing system 106. For example, instead of scheduling the drop-off, the customer arrives at a lockbox location and uses the lockbox computing system 106 to request access to a lockbox 108 for the drop-off. In response to the drop-off request, the lockbox request circuit 134 is configured to, for example, receive information about the customer and/or the drop-off from the lockbox computing system 106 to facilitate the drop-off.

Additionally, in some embodiments, the lockbox request circuit 134 is configured to receive access credentials (e.g., from the lockbox computing system 106 or directly from the customer device 102) provided by the customer to access a lockbox 108 for the drop-off. In various arrangements, access credentials include an order number for the drop-off, a customer password, a customer PIN, and/or a customer biometric. The lockbox request circuit 134 is configured to verify the access credentials, such as by comparing a received access credential with a template credential stored in the customer accounts database 138 and/or lockbox database 140. For example, the customer provides a payment card number (e.g., by inserting a payment card associated with a customer account into a card receptacle in the lockbox computing system 106) and PIN to the lockbox computing system 106, which provides the card number and PIN to the lockbox request circuit 134. The lockbox request circuit 134 identifies the customer using the card number and verifies the PIN with a reference PIN previously provided by the customer and stored in the customer accounts database 138. If the PINs match, the lockbox request circuit 134 indicates that the lockbox computing system 106 should provide the customer with access to a lockbox 108. If the PINs do not match, the lockbox request circuit 134, for example, indicates to the lockbox computing system 106 that the customer needs to reenter the PIN or that the drop-off should be denied. Alternatively, in other embodiments, the customer access credentials authentication is carried out partially or totally by the lockbox computing system 106.

The account processing circuit 136 is configured to appropriately credit the customer's account with the drop-off deposit. For example, once an employee of the account provider (e.g., located at a centralized and secure vault) has verified the amount included in the currency drop-off, the employee provides that confirmation to the account processing circuit 136, which then credits that amount to the customer's account. In some arrangements, the account processing circuit 136 is configured to provide a provisional credit to the customer's account once the drop-off has been confirmed to prevent double usage of the drop-off funds. For example, if the drop-off weight matches an expected weight for the amount of the deposit provided by the customer, the account processing circuit 136 is configured to show a provisional credit in the customer's account (e.g., on an online banking website) that the customer can use once the deposit is confirmed. Additionally, in some embodiments, the account processing circuit 136 is configured to keep track of all lockbox drop-offs submitted and completed by the customer in order to comply with regulatory rules. Moreover, in certain embodiments, the account processing circuit 136 and the lockbox computing system 106 both keep track of the customer's drop-off transaction history, including details from request submission to completion by the customer.

The customer makes the currency drop-off at the lockbox bank 105, which includes the one or more lockboxes 108 coupled to the safe 176 and a terminal of the lockbox computing system 106 communicably coupled to the one or more lockboxes 108. The lockbox computing system 106 controls the operation of and access to the one or more lockboxes 108. In some arrangements, the one or more lockboxes 108 are provided at a lockbox bank 105 location, and the lockbox computing system 106 only controls the lockbox(es) 108 at that given location. For example, a building contains fifty lockboxes 108 that are controlled by a first lockbox computing system 106 connected to the provider computing system 104, and another building contains ten lockboxes 108 that are controlled by a second lockbox computing system 106. In other arrangements, the lockbox computing system 106 controls all lockboxes 108 provided as part of a lockbox drop-off service provided by the account provider. In yet other arrangements, the lockbox computing system 106 is associated with a single lockbox 108.

As illustrated in FIG. 1, the lockbox computing system 106 includes a network interface 150, an input/output circuit 152, a display 154, an access control circuit 156, and a content verification circuit 158. The network interface 150 is structured to facilitate operative communication between the lockbox computing system 106 and the other components of the system 100. For example, the network interface 150 is structured to facilitate communication between the lockbox computing system 106 and the customer device 102 and the provider computing system 104.

The input/output circuit 152 is configured to receive input from various customers via the lockbox computing system 106 and/or provide output to various customers via the lockbox computing system 106. Similar to the input/output circuit 122 of the customer device 102, in various embodiments, the input/output circuit 152 includes one or more input and/or output devices. For example, the input/output circuit 152 includes a keypad, a biometric sensor, a card reader, a barcode scanner, and/or a fob sensor. Alternatively, or additionally, the input/output circuit 152 is configured to receive and/or send communications to one or more other components of the lockbox computing system 106. In some arrangements, the customer uses the input/output circuit 152 to provide access credentials to the lockbox computing system 106. Further, in some arrangements, the customer uses the input/output circuit 152 to make a request to use one of the lockboxes 108 to make a currency drop-off.

As shown in FIG. 1, in some embodiments, the input/output circuit 152 includes an NFC device 160. In various arrangements, the NFC device 160 is structured similarly to the NFC device 128 and is configured to communicate with another NFC device, such as the NFC device 128. Accordingly, in such embodiments, the input/output circuit 152 can receive lockbox access requests and/or access credentials from a customer via the NFC device 160 communicating with the NFC device 128 of the customer device 102. In one example, the NFC device 128 sends a code or key (e.g., as an access credential) to the NFC device 160 that the lockbox computing system 106 and/or provider computing system 104 can use to authenticate the customer. Alternatively, in other embodiments, the lockbox computing system 106 includes a different or additional type of short range communication device, such as an RFID device, through which the lockbox computing system 106 can communicate with the customer device 102. In still other embodiments, the lockbox computing system 106 does not include a short-range communication device (e.g., the customer instead accesses the lockbox 108 by providing an order number or passcode to the lockbox computing system 106).

In some arrangements, the input/output circuit 152 is provided at a terminal of the lockbox computing system 106 at the lockbox bank 105. Alternatively, in other arrangements, the input/output circuit 152 is at least partially provided as part of each of the lockboxes 108. For example, each lockbox 108 includes a keypad, NFC device 160, biometric sensor, card reader, barcode sensor, fob reader, and the like. The customer then provides access credentials at the specific lockbox 108 for the drop-off, for example, assigned by the provider computing system 104 for the drop-off based on a drop-off request submitted by the customer using the customer device 102.

The display 154 is configured to visually present information (e.g., user interfaces) to various customers. In some embodiments, the display 154 is further configured to receive information from various customers (e.g., through a keyboard provided as part of a touchscreen of the display 154). Additionally, in some arrangements, the display 154 is included in or communicably coupled to the input/output circuit 122.

The access control circuit 156 is configured to receive an authentication request from a customer at the lockbox computing system 106 terminal. The access control circuit 156 then determines whether to grant the requestor access to a lockbox 108. In various embodiments, the access control circuit 156 is configured to receive an access credential, such an order number, a passcode, a password, a PIN, a biometric, an access code, or the like, from a customer (e.g., via a touchscreen of the display 154, via the customer device 102 communicating through the NFC device 160, via a lockbox fob). The access control circuit 156 is configured to then authenticate the customer using the access credential. In some arrangements, the access control circuit 156 is configured to authenticate the customer by providing the access credential(s) to the provider computing system 104, which verifies the access credential(s) and provides the access control circuit 156 with an indication of whether the customer is authenticated, as described above. In other embodiments, the access control circuit 156 is configured to authenticate the customer. In one example, the provider computing system 104 provides a list of verified order numbers to the lockbox computing system 106. The access control circuit 156 is thus configured to grant lockbox 108 access to a customer who provides one of the verified order numbers to the lockbox computing system 106. For example, the access control circuit 156 pops open the lockbox 108 for the customer, indicates the number of the lockbox 108 to the customer, which is automatically opened or openable by the customer via NFC, and so on. Additionally, in some embodiments, the access control circuit 156 is configured to maintain a log of access requests, for example, including timestamps, identification of the requestor, a record of access credentials, and other information describing the request.

The content verification circuit 158 is configured to communicate with the lockbox 108 that a customer has been granted permission to access in order to verify the contents of the drop-off. For example, in some arrangements, the content verification circuit 158 is configured to receive the weight of the drop-off from the lockbox 108. The content verification circuit 158 then determines whether the weight matches an expected weight of the drop-off based on an amount the customer indicated would be included in the drop-off. For example, the content verification circuit 158 provides the weight of the drop-off to the provider computing system 104, which verifies the weight with an amount for the drop-off provided by the customer when the customer arranged the drop-off, as stored in the lockbox database 140. The lockbox computing system 106 or the provider computing system 104 then provides a notification to the customer indicating whether the drop-off weight matches the estimated weight for the drop-off. Further, in certain arrangements, the content verification circuit 158 uses machine-based learning to determine whether the drop-off weight is correct, such as by engaging a feedback loop from several verified checks from an employee of the customer to refine the accepted weight or weight range for the drop-off. Alternatively, in some arrangements, the content verification circuit 158 instructs the lockbox computing system 106 to reject the drop-off if the weight of the drop-off does not match the expected weight. In yet other arrangements, the weight is used to verify how many drop-offs have been made to serve as a replacement for certain branch tamper checks.

As another example, in some arrangements, the content verification circuit 158 receives information from the lockbox 108 about the bag used for the drop-off, such as an identifying code detected from an NFC device or RFID device embedded in the bag or a barcode on the bag that identifies the bag. The content verification circuit 158 then uses the identifying code to verify, or provides the code to the provider computing system 104 to verify, the customer associated with the bag. In certain arrangements, rather than providing access credentials to the access control circuit 156 as described above, the customer simply requests that the access control circuit 156 grant the customer lockbox 108 access to make a drop-off. The access control circuit 156 unlocks one of the lockboxes 108, and the customer makes the drop-off in the lockbox 108. The content verification circuit 158 then determines an identity of the customer using the identifying code (e.g., which is associated with a default account for the customer to which the drop-off should be credited). In this way, the customer does not need to provide any access credentials to the lockbox computing system 106 or request a drop-off beforehand in order to make the drop-off.

The one or more lockboxes 108 are structured to be secure containers for receiving currency drop-offs. In some embodiments, the one or more lockboxes 108 are configured specifically for currency drop-offs. In other embodiments, the one or more lockboxes 108 are configured to serve other lockbox functions and are repurposed as currency drop-off lockboxes 108, for example, once business hours are over. For example, during business hours, the one or more lockboxes 108 are used by the provider for making currency withdrawals by customers.

Each lockbox 108 includes a receptacle 170 configured to receive a currency drop-off from a customer. The configuration of the receptacle 170 depends on the configuration of the lockbox 108. In one example, if the lockbox 108 is shaped as a cube, the receptacle 170 is also cube-shaped. The size of the receptacle 170 can also vary depending on, for example, the configuration of the lockbox 108 or the intended use of the lockbox 108. In one example, the lockbox bank 105 includes lockboxes 108 in different sizes with differently sized receptacles 170 configured to receive different drop-off amounts. Moreover, in some arrangements, rather than being configured to receive a bag containing a drop-off, the receptacle 170 is configured with repositories for different types of currency, such as coin repositories and bill repositories. Additionally, as described in further detail below, in some embodiments, the receptacle 170 is configured to be altered or adjusted in order to move a currency drop-off from the receptacle 170 to a secure location (e.g., the safe 176).

Each receptacle 170 also includes a locking mechanism 171 configured to lock, open, close, or otherwise control access to the secure receptacle 170. For example, a locking mechanism 171 according to various embodiments includes a solenoid, motor, actuator, or other mechanical device configured to physically lock or unlock a door or other access point (e.g., implemented as a magnetic lock configured to selectively power and de-power an electromagnet that holds a door in a locked position). The locking mechanism 171 is controlled by the lockbox computing system 106 such that the lockbox computing system 106 limits access to the receptacle 170.

In various embodiments, each lockbox 108 includes one or more sensors configured to provide information about use of the lockbox 108 to the lockbox computing system 106. For example, in the embodiment of FIG. 1, the lockbox 108 includes an identification sensor 172 and a weight sensor 174. The identification sensor 172 is configured to be used in identifying which customer is making the drop-off. In one example, the identification sensor 172 includes an NFC or RFID device that can receive a code from a corresponding NFC or RFID device in the drop-off bag, or a barcode scanner configured to scan a barcode on the drop-off bag, as described above. In other examples, the identification sensor 172 includes a different or additional device, such as a camera that can be used to identify the customer making the drop-off via facial recognition, a fingerprint scanner that can be used to identify the customer through a stored biometric, and so on. The weight sensor 174 is configured to weigh the currency drop-off inserted into the receptacle 170. As described above, the weight can be used to verify whether the drop-off matches an amount of the drop-off specified by the customer. It should be understood that in other embodiments, however, the lockbox 108 includes additional or different sensors from the identification sensor 172 and the weight sensor 174. Alternatively, the lockbox 108 includes no sensors, and all verification of the drop-off is conducted manually.

As shown in FIG. 1, in various embodiments, the lockboxes 108 are coupled to a safe 176. The safe 176 is configured to serve as a secure location to store drop-offs made at the one or more lockboxes 108. In some embodiments, the safe 176 is further accessible at a secure withdrawal point for removal of drop-offs. For example, the safe 176 is accessible through a secure door that is hidden from publicly accessible areas from which the drop-offs can be removed and transported, such as by armored courier, to a branch or central vault of the provider for counting and deposit. In this way, drop-offs can be made and transported to a secure site without, for example, the drop-offs having to be handled by tellers. Additionally, by relocating drop-offs into the safe 176, the lockboxes 108 can be used by additional customers before the drop-offs are picked up. In various arrangements, the lockboxes 108 are configured to move currency drop-offs to the safe 176, for example, by moving a bottom of the receptacle 170 in such a way that the drop-off falls into the safe 176.

Figure 2:
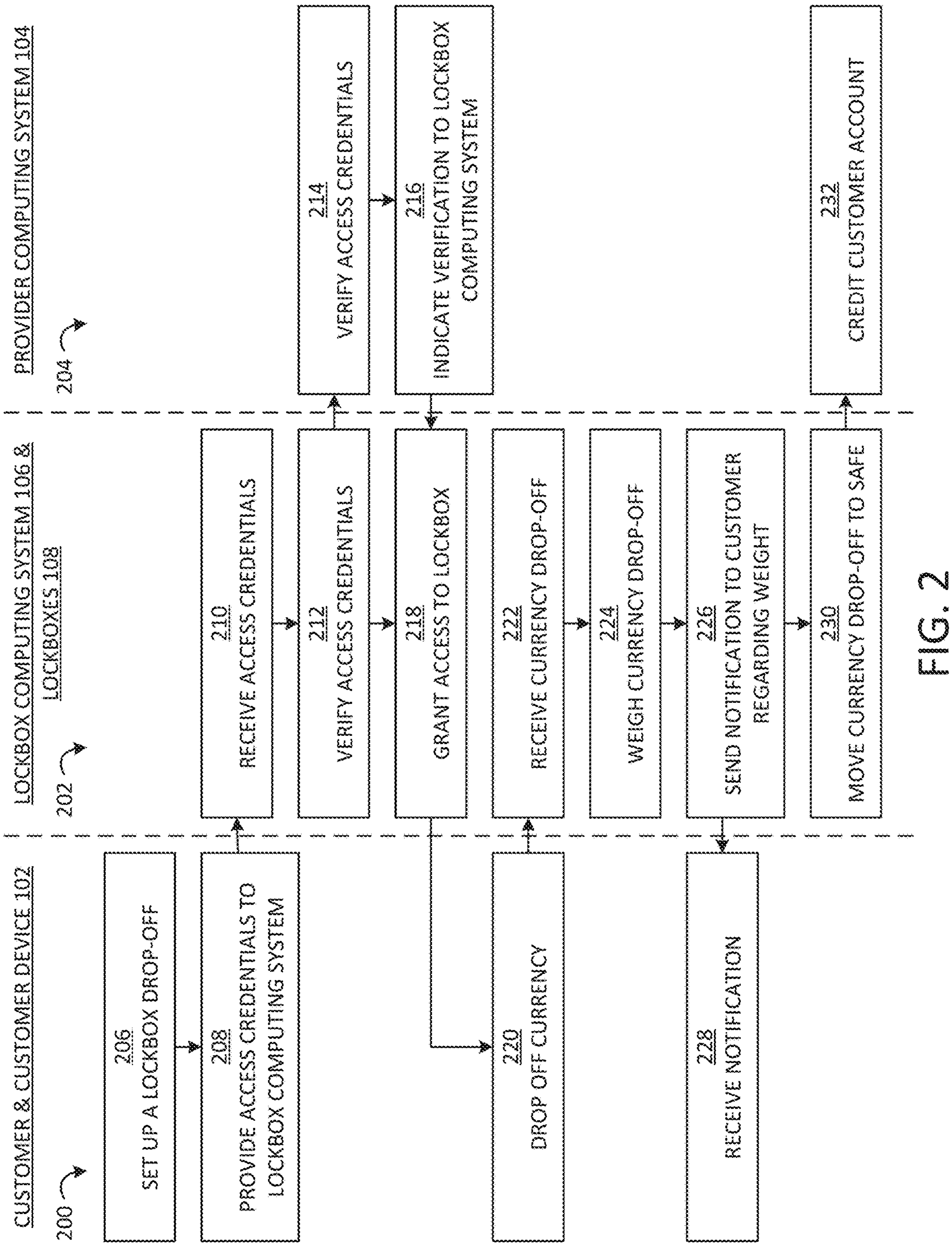
FIG. 2 illustrates a flow diagram of a method of making a lockbox drop-off, according to an example embodiment.

Referring to FIG. 2, a flow diagram of a method for a currency drop off via a lockbox 108 is shown, according to an exemplary embodiment. The process 200 is performed in connection with a customer (e.g., an account holder with the provider) and the customer device 102. Alternatively, the process 200 is performed in connection with someone serving on the behalf of the customer, such as an employee, agent, or representative. As such, it should be understood that FIG. 2 is described with reference to a customer, but the at least some of the actions performed in the method may alternatively be performed by an individual serving on the customer's behalf. Additionally, the method illustrated in FIG. 2 is performed in connection with the lockbox computing system 106 and one or more lockboxes 108, as well as the provider computing system 104. Accordingly, process 202 is performed by the lockbox computing system 106 and a lockboxes 108, and process 204 is performed by the provider computing system 104.

The customer sets up a lockbox drop-off at 206. In some embodiments, the customer uses the customer device 102 to access, for example, an application or a website associated with the provider, through which the customer inputs information about the drop-off. The provider computing system 104 then uses that information to set up the drop off. For example, the customer inputs an amount of the drop-off and a desired location for the drop off, which the provider computing system 104 confirms by providing the customer with an order number. In other embodiments, the customer sets up a lockbox drop-off through another method, such as by calling a service center associated with the provider or by visiting a branch location associated with a provider and working with a provider employee to set up the drop-off. Alternatively, in some embodiments, the customer does not set up a lockbox drop-off 206 ahead of the drop-off. Instead, the customer simply visits the lockbox bank 105 and arranges the drop-off on site.

The customer provides access credentials to the lockbox computing system 106 at 208. In various embodiments, the customer provides access credentials to the lockbox computing system 106 via a terminal associated with the lockbox computing system 106 at the lockbox bank 105. In some embodiments, the customer uses the customer device 102 to transmit the access credentials. For example, the customer opens an application associated with the provider on the customer device 102, and the customer device 102 transmits the access credentials to the lockbox computing system 106 (e.g., via NFC or RFID). In other embodiments, the customer inputs access credentials through an input/output device of the lockbox computing system 106, such a keypad or touchscreen. Depending on the embodiment, the access credentials are an order number, a PIN, a password, a passcode, a biometric, and the like. Additionally, in some arrangements, the customer uses a physical object to provide at least some of the access credentials, such as a fob that the customer touches to a fob reader of the lockbox computing system 106 terminal or a payment card associated with a customer account that the customer inserts into a card reader of the terminal. Further, in some arrangements, the customer provides more than one access credential to the lockbox computing system 106 to gain access to the lockbox 108, such as a customer identifier (e.g., a customer name, email address, phone number) and an authenticator (e.g., a password, biometric sample, fob). For example, the customer provides two-factor authentication access credentials to the lockbox computing system 106.

Alternatively, in other arrangements, the customer provides no access credentials to the lockbox computing system 106. Instead, the customer simply requests access to a lockbox 108, and the lockbox computing system 106 verifies the identity of the customer making the drop-off through another method, such as by identifying the customer through an NFC or RFID device in the bag used for the drop-off or identifying the customer using a camera provided at the lockbox bank 105.

The lockbox computing system 106 receives the access credentials at 210. The lockbox computing system 106 then verifies the access credentials at 212. If the customer is verified, the lockbox computing system 106 grants the customer access to a lockbox 108 at 218. In some embodiments, the lockbox computing system 106 itself verifies the access credentials. For example, the lockbox computing system 106 receives a list of order numbers for prearranged drop-offs for a given period of time from the provider computing system 104. As such, when the lockbox computing system 106 receives an order number from a customer, the lockbox computing system 106 verifies the input order number by comparing the order number to the list. If the order number matches a number on the list, the lockbox computing system 106 grants the customer access to a lockbox 108 (e.g., by unlocking the locking mechanism 171 of the lockbox 108).

Alternatively or additionally, the lockbox computing system 106 communicates with the provider computing system 104 to verify the access credentials at 214. For example, the lockbox computing system 106 provides the access credentials to the provider computing system 104, which verifies whether they match template or reference access credentials stored for the customer in the customer accounts database 138 and/or the lockbox database 140. The provider computing system 104 then indicates that the access credentials have been verified to the lockbox computing system 106 at 216. In response, the lockbox computing system 106 grants the customer access to a lockbox 108 at 218 (e.g., by unlocking the locking mechanism 171 of the lockbox 108).

Once the customer has been given access to the lockbox 108, the customer drops off the currency deposit at 220. To do this, for example, the customer places the currency drop-off in the unlocked lockbox 108. The customer then relocks the lockbox 108, for example, by closing the door of the lockbox 108. In some arrangements, the locking mechanism 171 of the lockbox 108 relocks automatically once the door is closed. In other arrangements, the locking mechanism 171 of the lockbox 108 relocks once the customer indicates to the lockbox computing system 106 that the drop-off has been completed or once the lockbox computing system 106 verifies the drop-off by, for example, weighing the deposit, as described below.

The lockbox 108 receives the currency deposit at 222. In some embodiments, as part of receiving the currency deposit, the lockbox computing system 106 and lockbox 108 perform one or more actions to verify details about the deposit and/or the customer making the deposit. For example, the lockbox 108 identifies an NFC or RFID device or scans a barcode on the bag used to make the drop-off. The lockbox computing system 106 then identifies or verifies the identity of the customer associated with the bag. As another example, the lockbox computing system 106 and lockbox 108 gather visual information about the customer dropping off the currency (e.g., via a camera positioned at the lockbox bank 105 or inside the lockbox 108) and identify the customer using the visual information (e.g., via facial recognition software)

In various embodiments, the lockbox 108 weighs the currency drop-off at 224. The lockbox computing system 106 then sends a notification to the customer regarding the weight at 226, which the customer device 102 receives at 228. For example, the lockbox computing system 106 uses the weight to determine whether the weight of the drop-off is close (e.g., within a certain amount of error) to what would be expected based on an amount of currency that the customer indicated would be dropped off when the customer set up the drop-off. In some arrangements, the weight is also used to verify that the drop-off was made as part of a branch tamper. Further, in some arrangements, an indication of whether the weight for the drop-off is correct is send to the provider computing system 104 and/or to the customer holding the account. Additionally, in some embodiments, the lockbox computing system 106 and the lockbox 108 take one or more additional or alternative actions to verify details about the deposit and/or the customer making the deposit, such as by having the customer submit a biometric when the customer makes the drop-off.

Once the lockbox computing system 106 determines that the drop-off has been completed (e.g., the customer has shut the door of the lockbox 108 and/or the lockbox computing system 106 has verified the weight of the drop-off), the lockbox 108 moves the deposit to the safe 176 at 230. In one example, the safe 176 is positioned below a bank of lockboxes 108. Accordingly, a bottom of the receptacle 170 of the lockbox 108 used for the drop-off slides or pulls away such that the drop-off falls into the safe 176. In another example, the safe 176 is positioned behind a bank of lockboxes 108. The back of the receptacle 170 thus slides or moves such that the drop-off slides into the safe 176. In some embodiments, the lockbox deposit is moved to a different safe 176 depending on whether details about the deposit were successfully verified. For example, a bank of lockboxes 108 is connected to two safes 176. If the weight of the drop-off matches an approximate expected weight of the drop-off, the lockbox computing system 106 causes the lockbox 108 to move the deposit to a first safe 176. If the weight of the drop-off does not match an approximate expected weight of the drop-off, the lockbox computing system 106 causes the lockbox 108 to move the deposit to a second safe 176. The drop-offs in the second safe are then subjected to, for example, more rigorous screening before deposit before the drop-offs in the first safe.

Once the deposit amount is verified, the customer's account is credited at 232. For example, at some point after the drop-off, all of the drop-offs at the lockbox 108 location are transported to a secure location (e.g., via armed courier), such as a branch of the provider or a main vault of the provider. The amount of the drop-off is then verified by an employee of the provider, who credits the amount of the drop-off to the customer's account.

Referring now to FIGS. 3-6, graphical users interfaces shown to a customer during registration of a currency drop-off are shown, according to exemplary embodiments. In some embodiments, FIGS. 3-6 represent example screenshots of user interfaces shown to a customer on the display 124 of the customer device 102 during registration of a new currency drop-off. For example, in the embodiments of FIGS. 3-6, the user interfaces are presented to the customer as part of an application associated with the provider 300, such as a dedicated provider application running on the customer device 102 or as part of a web browser that the customer uses to access a website associated with the provider on the customer device 102.

Figure 3:
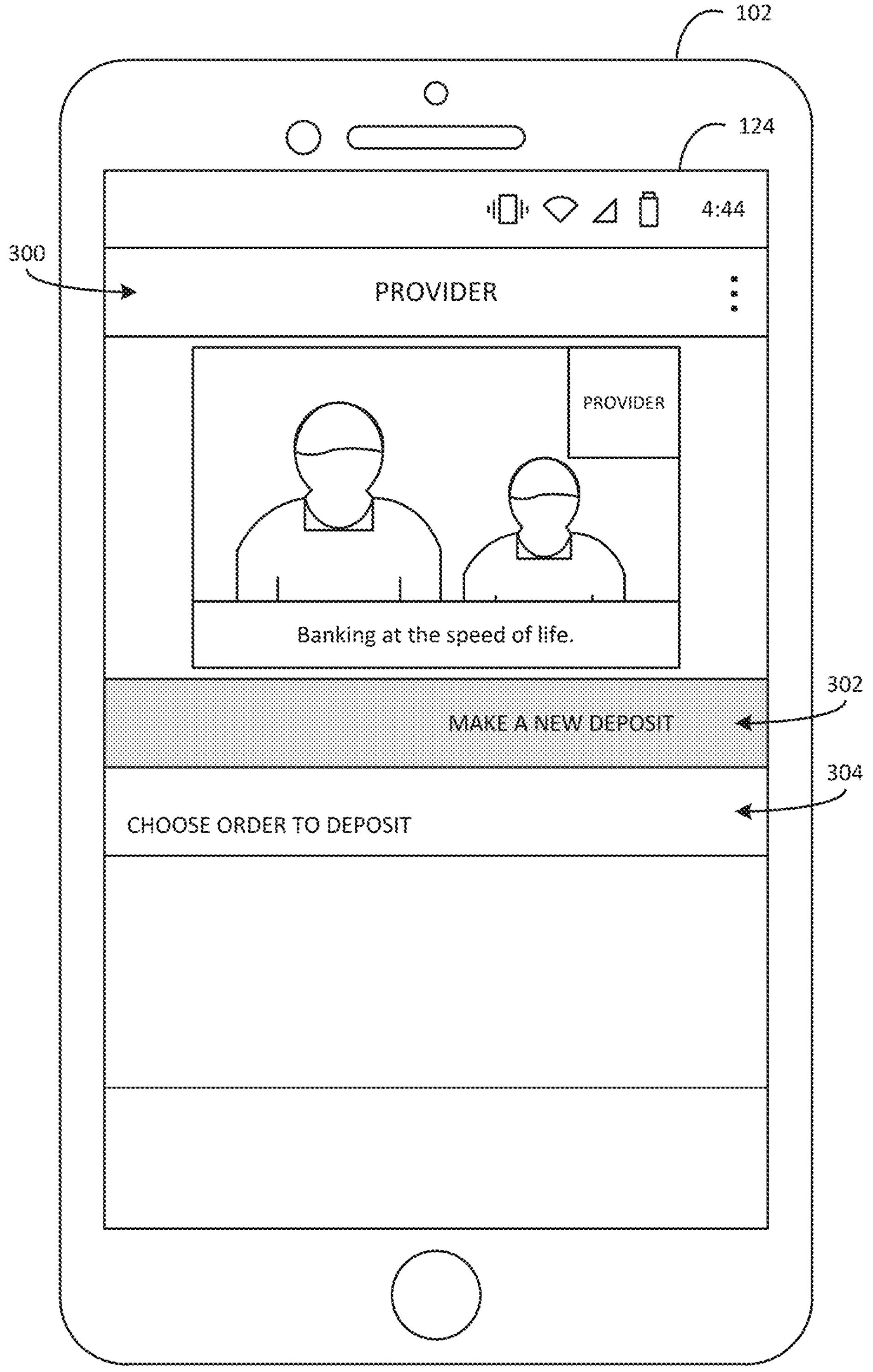
FIG. 3-6 illustrate graphical user interfaces shown to a customer during registration of a new lockbox drop-off, according to an example embodiment.

Referring first to FIG. 3, a "make a new deposit" button 302 is shown to the customer as part of the provider application 300. The customer can select the deposit button 302 to arrange a new currency drop-off deposit with the provider computing system 104. Additionally, the customer is shown a currency drop-off order section 304, which includes the customer's pending and/or past drop-off orders. In the embodiment of FIG. 3, the currency drop-off order section 304 is empty indicating, for example, that the customer does not have any pending drop-offs.

Figure 4:
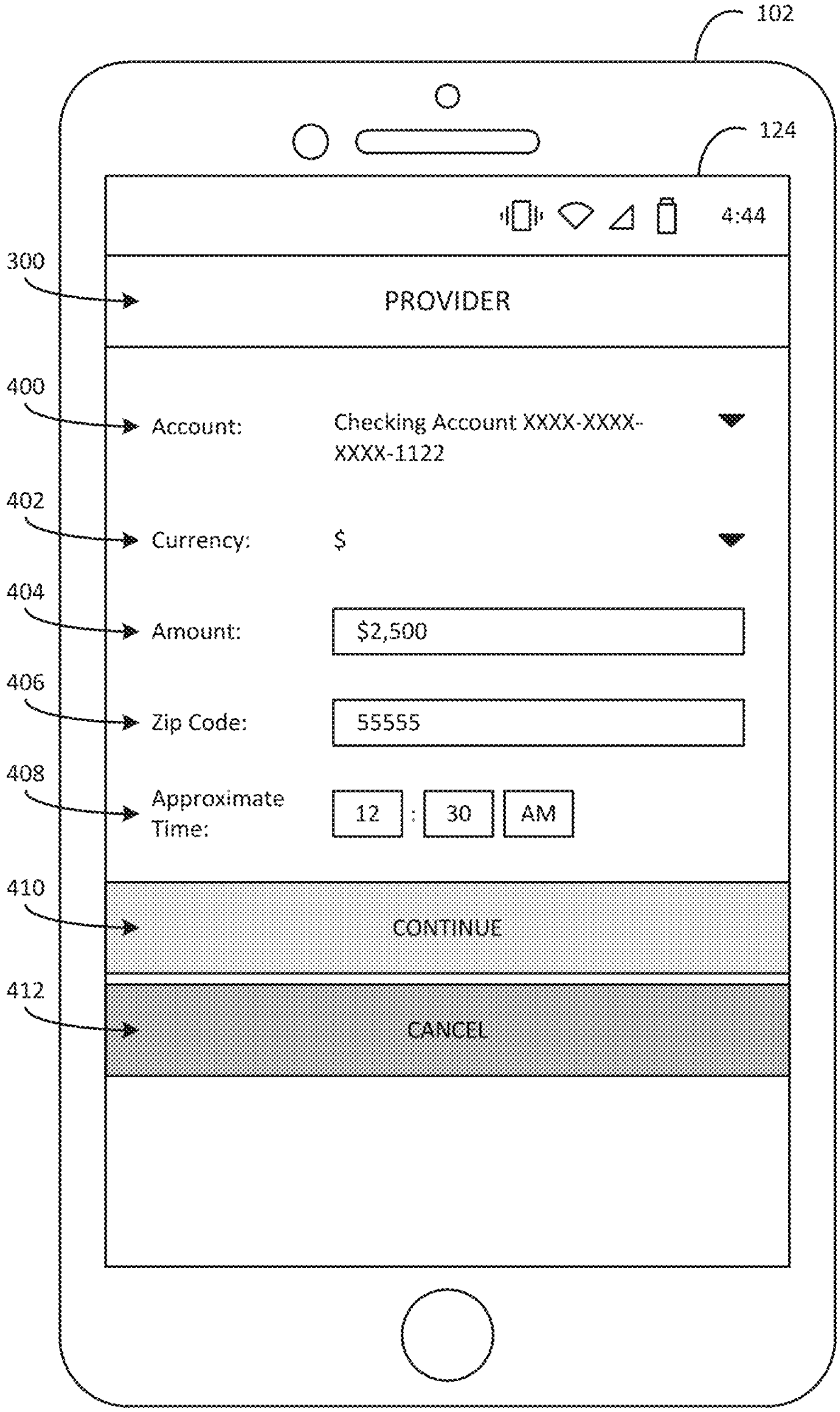

In response to the customer selecting the deposit button 302, for example, the customer is redirected to the user interface shown in FIG. 4. FIG. 4 includes fields whereby the customer can set up a currency drop-off. For example, in the embodiment of FIG. 4, the customer is presented with an account field 400 whereby the customer can select an account held by the customer to which the customer would like the drop-off deposited, a currency field 402 whereby the customer can select the currency of the drop-off, and an amount field 404 whereby the customer can input an amount or an estimated amount of the drop-off. Moreover, in the embodiment of FIG. 4, the customer is presented with a zip code field 406 whereby the customer can input the customer's current zip code or a desired zip code for the drop-off and a time field 408 whereby the customer can input an approximate time that the customer plans to make the drop-off. Once the customer has made inputs into the fields 400-408, the customer can press a continue button 410 to continue setting up the drop-off. In response to the customer selecting the continue button 410, the customer's input in the fields 400-408 are transmitted to the provider computing system 104. The provider computing system 104 can use the inputs from the zip code field 406 and the time field 408 to determine an available lockbox for the drop-off. Alternatively, if the customer wants to cancel the drop-off process, the customer can press a cancel button 412.

It should be understood that the fields 400-408 shown in FIG. 4 are example fields and that in other embodiments, additional or different fields are used. For example, in some embodiments, the user is not presented with a zip code field 406 and an approximate time field 408. Instead, the provider computing system 104 selects a drop-off location for the customer based on, for example, a location of the customer's home branch of the provider or based on a location of the customer provided to the provider computing system 104 by the customer device 102 (e.g., based on global positioning system ("GPS") functionality of the customer device 102).

Figure 5:
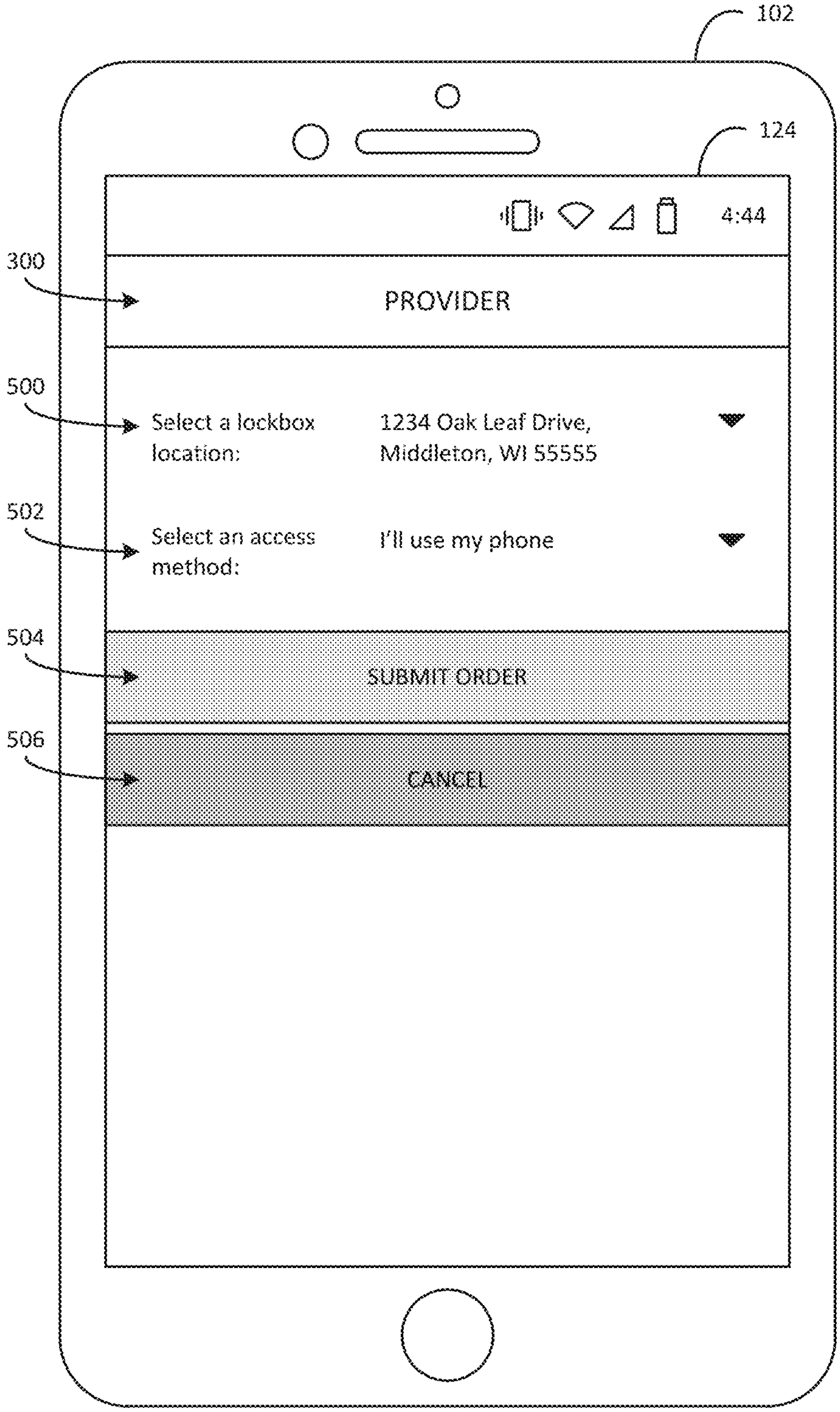

If the customer presses the continue button 410, for example, the customer is redirected to the user interface shown in FIG. 5, which includes several fields relating to a location of the lockbox for the drop-off. In a lockbox field 500, the customer can select a lockbox location for the drop-off. For example, in some embodiments, the provider computing system 104 provides the customer with a selection of lockbox bank locations based on the customer's zip code and approximate drop-off time provided in the user interface of FIG. 4. The customer can select which lockbox bank location the customer would like to use for the drop-off through a drop-down menu in the lockbox field 500. Additionally, the customer can select an access method for the lockbox in the access method field 502. As an example, the customer has the option of providing an order number to the lockbox or using the customer device 102 at the lockbox as the way to access the lockbox. It should be understood, however, that the user interface shown in FIG. 5 is different in other embodiments or not shown to the customer at all. As an illustration, in some embodiments, the customer is shown a list of possible lockbox locations at which the customer can make the currency drop-off, and the customer simply goes to one of those locations without pre-selecting the location beforehand.

Once the customer is satisfied with the lockbox location and access method selections, the customer can press a submit order button 504 to confirm the drop-off options selected. The customer's selections in input fields 500 and 502 are then transmitted to the provider computing system 104. Alternatively, the customer can select a cancel button 506 to cancel the drop-off order or go back to the user interface shown in FIG. 4, depending on the embodiment.

Figure 6:
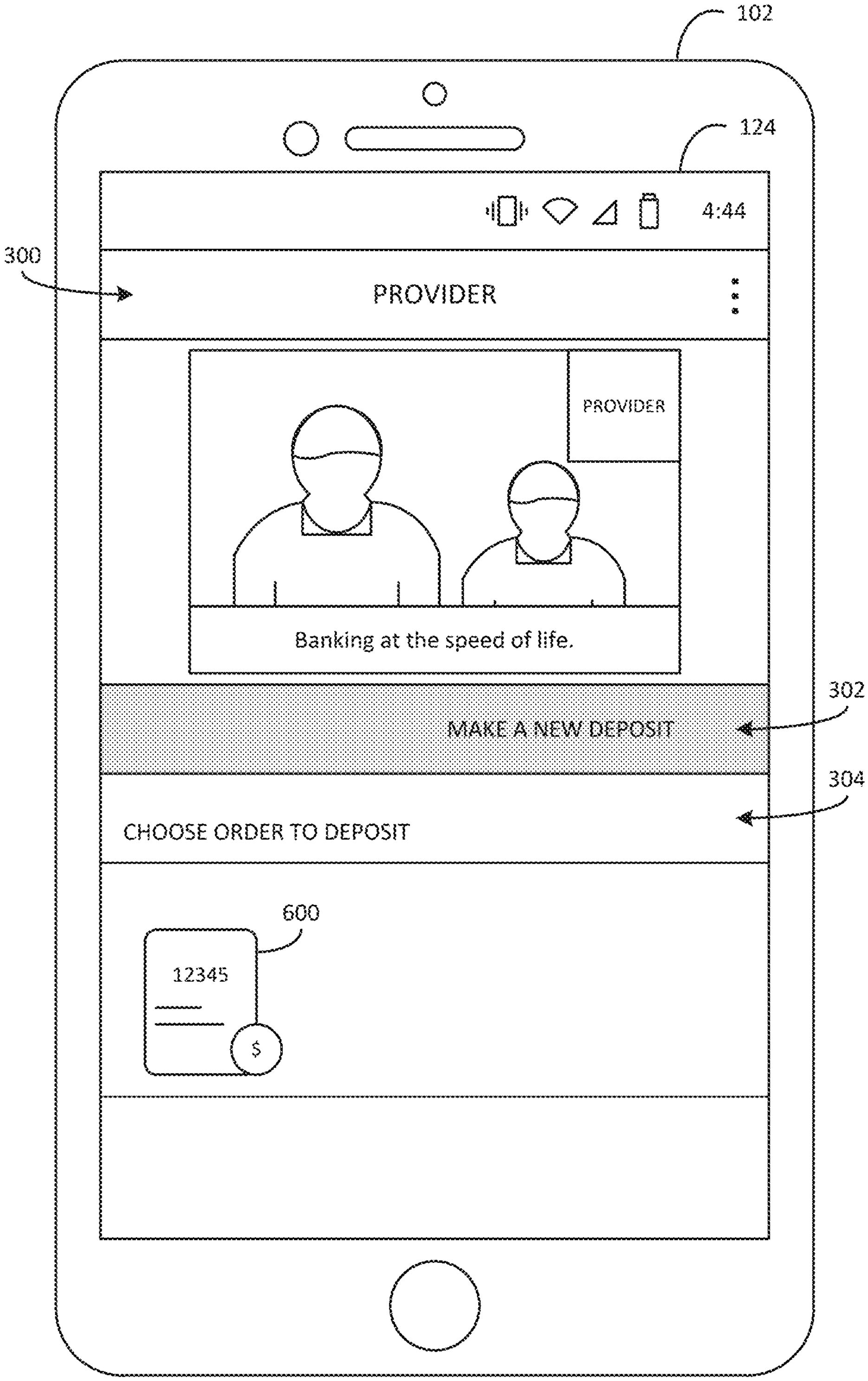

In response to the customer selecting the submit order button 504, the drop-off order is confirmed, and the user is redirected to the user interface shown in FIG. 6. The user interface shown in FIG. 6 is similar to the user interface shown in FIG. 3, but in FIG. 6, the order section 304 includes an icon 600 with an order number (e.g., "12345" in the embodiment of FIG. 6) for the currency drop-off order that the customer submitted. In some embodiments, the customer can use the order number to access the lockbox 108. In other embodiments, the customer can select the icon 600 to open a page with instructions for using the customer device 102 to access the lockbox 108 (e.g., through the customer device 102 transmitting an NFC code to the lockbox in response to the customer selecting the icon 600).

Figure 7:
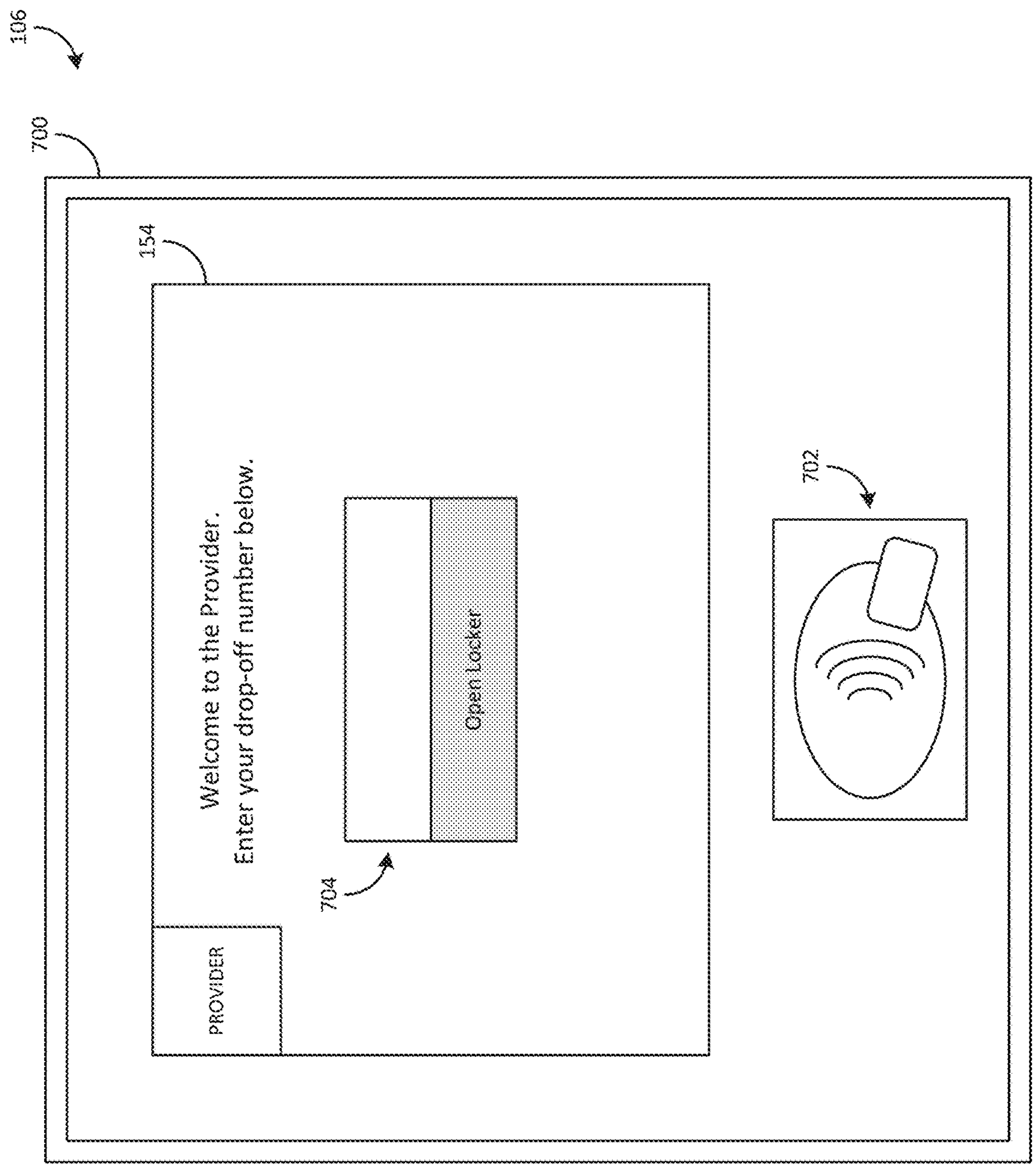
FIGS. 7 and 8 illustrate front views of a terminal of a lockbox computing system, according to an example embodiment.

FIG. 7 illustrates a front view of a terminal 700 of the lockbox computing system 106 located at the lockbox bank 105 that the customer can use to access a lockbox 108 to make a currency drop-off. The terminal 700 includes the display 154 showing a user interface to the customer and an NFC icon 702 indicating the location of an NFC device on the terminal 700. As shown in FIG. 7, the user interface shown on the display 154 includes a section 704 whereby the customer can input the order number for the currency drop-off to access the lockbox 108 assigned for the customer's order.

Figure 8:
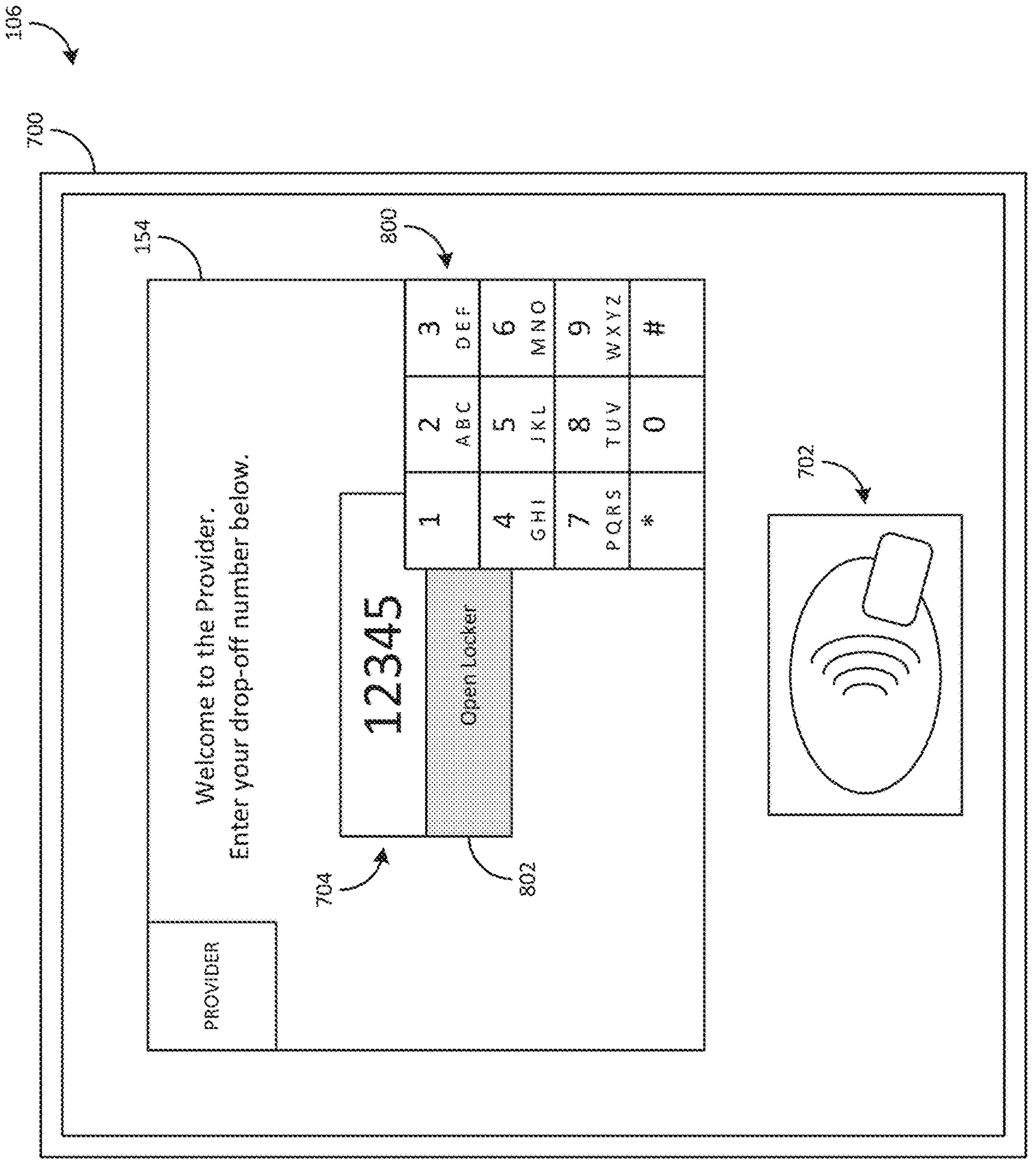

For example, as shown in FIG. 8, the customer can select the input section 704, in response to which the customer is provided with a keypad 800 on the display 154 that the customer can use to input the order number (e.g., 12345, as shown in FIG. 6). Alternatively, in other embodiments, the customer inputs another string of alphanumeric characters, such as a password or a PIN, to access the lockbox 108 assigned for the customer's order. When the customer has finished inputting the order number or other string of alphanumeric characters, the customer can select the "Open Locker" button 802 to open the locker. In various embodiments, the lockbox computing system 106 verifies whether the input credentials are correct (e.g., verifies whether the input order number matches an order number stored at the lockbox computing system 106 or communicates with the provider computing system 104 to verify that the input order number matches an order number stored at the provider computing system 104), in response to which the lockbox computing system 106 opens a lockbox 108 for the customer.

Alternatively, the customer can use the customer device 102 at the terminal 700 to open the lockbox computing system 106. For example, the customer can select the icon 600 shown in FIG. 6, in response to which the customer is redirected to the user interface shown in FIG. 9. The user interface includes a section 900 instructing the customer to hold the device to the locker terminal 700. Additionally, in response to the customer selecting the icon 600, the customer device 102 transmits an access code (e.g., via NFC), which the locker terminal 700 receives via the NFC device (e.g., provided under the NFC icon 702). The locker terminal 700 verifies the access code (e.g., by communicating with the provider computing system 104) to determine whether to grant the customer access to the locker terminal 700. The customer can also select a cancel button 902 to exit out of the user interface (e.g., reverting the customer to the user interface shown in FIG. 6).

Figure 9:
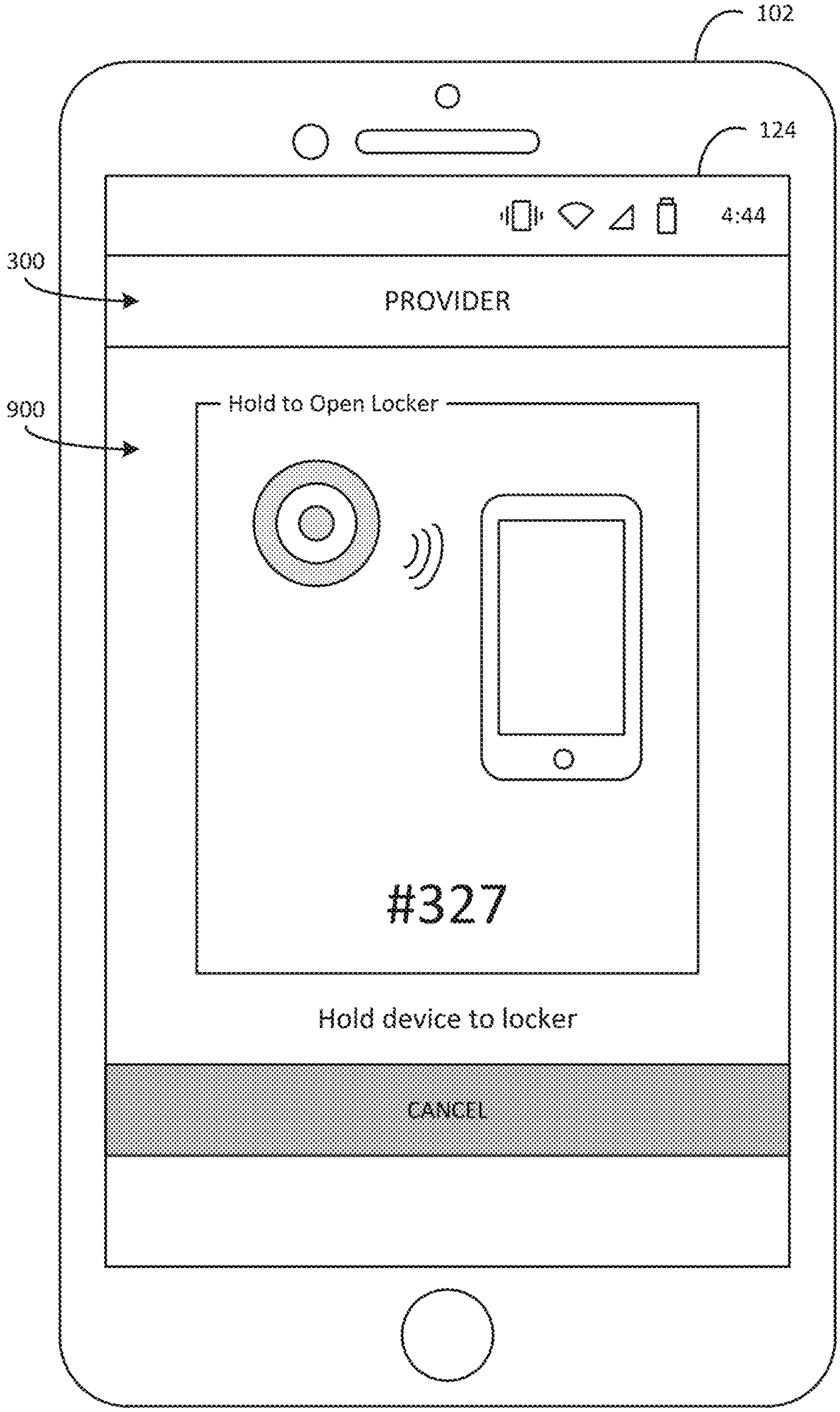
FIG. 9 illustrates graphical user interfaces shown to a customer as part of accessing a lockbox, according to an example embodiment.

However, it should be understood that FIGS. 8 and 9 illustrate example user interfaces presented to the customer as part of accessing a lockbox 8. Other user interfaces and/or other lockbox access procedures are used in other embodiments. As an illustration, in some embodiments, the customer does not prearrange a currency drop-off. Instead, the customer goes to a lockbox location and inputs certain customer credentials. For example, the customer swipes, inserts, or waves by the NFC device a payment card (e.g., a debit card) associated with the account to which the customer wants to make the deposit. The customer then enters a PIN associated with the payment card. In response to authenticating the customer via the payment card and PIN, the lockbox computing system 106 opens one of the lockboxes 108. The customer can then make a deposit. As another illustration, the customer does not prearrange a currency drop-off and does not input any access credentials at the lockbox bank 105. Instead, the customer uses a bag with identifying information about the customer (e.g., a bag with an NFC or RFID device configured to transmit a code associated with the customer) and simply requests to access a lockbox 108. The lockbox 108 or an employee associated with the provider determines that the bag is associated with the customer (e.g., by using an NFC or RFID device to perform an NFC tap with the device in the bag), and the deposit is credited, for example, to a default account associated with the customer or to an account later selected by the customer, for example, via an email or an automated phone call.

Figure 10:
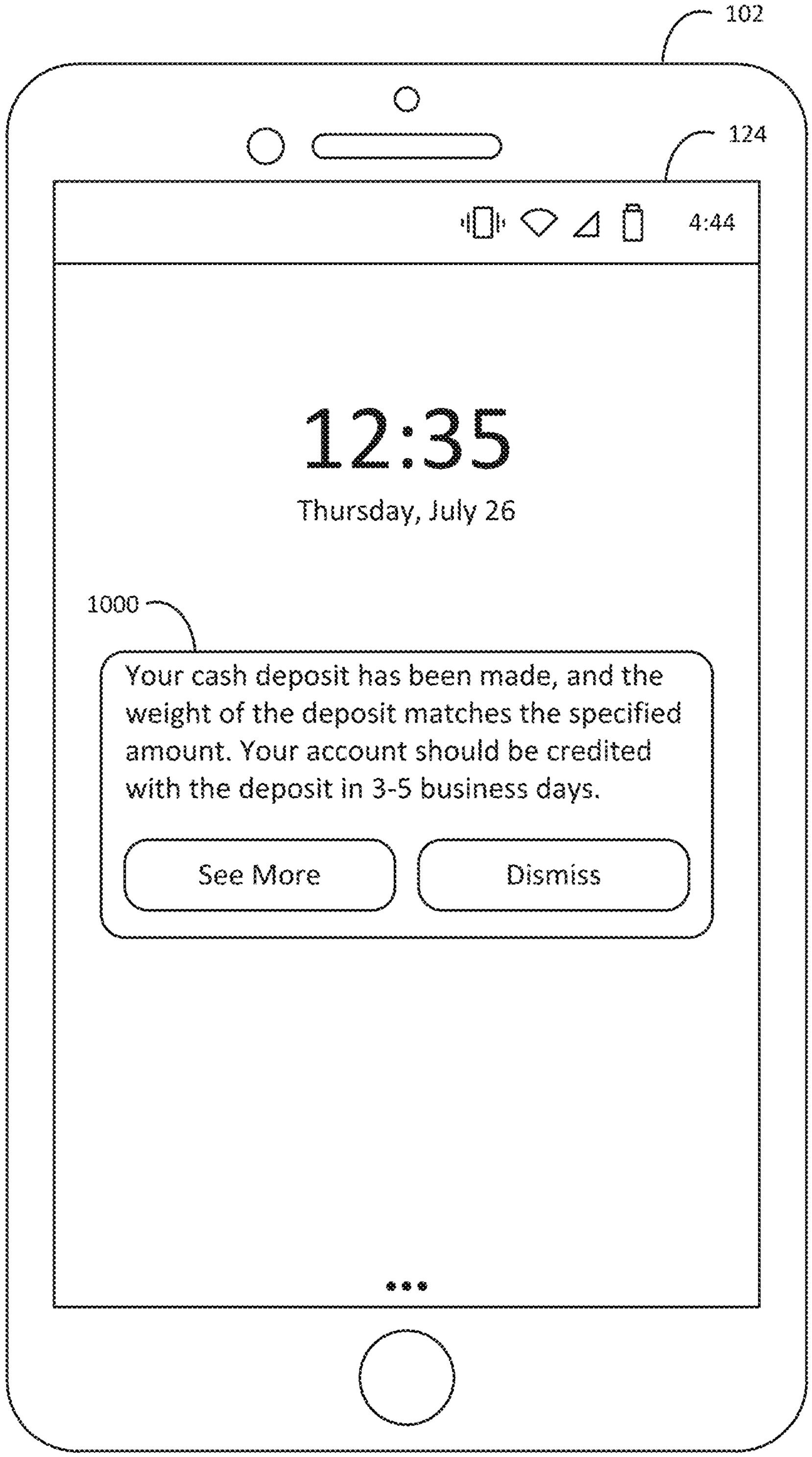
FIG. 10 illustrates a graphical user interface shown to a customer after a lockbox drop-off, according to an example embodiment.

As discussed above, in various embodiments, the provider computing system 104 and/or the lockbox computing system 106 use a weight of the currency drop-off to determine whether the drop-off matches an expected weight based on the amount for the drop-off entered by the customer (e.g., $2,500 in the embodiment of FIG. 4). If the weight matches or is within an acceptable amount of error of the expected weight, the provider computing system 104 or the lockbox computing system 106 transmits a notification to the customer device 102 indicating the same. As an example, FIG. 10 shows a push notification 1000 received on the customer device 102. The push notification indicates that the currency drop-off has been made, that the weight of the drop-off matches the specified amount for the drop-off, and that the customer's account will be credited in 3-5 business days. It should be understood, however, that the push notification 1000 is merely an example notification and that other notifications can instead be used in other embodiments, such as an email, an automated phone call, a text message, and so on.

The embodiments described herein have been described with reference to drawings. The drawings illustrate certain details of specific embodiments that implement the systems, methods and programs described herein. However, describing the embodiments with drawings should not be construed as imposing on the disclosure any limitations present in the drawings.

It should be understood that no claim element herein is to be construed under the provisions of 35 U.S.C. § 112(f), unless the element is expressly recited using the phrase "means for."

As used herein, in various embodiments, the term "circuit" includes hardware structured to execute the functions described herein. In some embodiments, each respective "circuit" includes machine-readable media for configuring the hardware to execute the functions described herein. The circuit is embodied as one or more circuitry components including, but not limited to, processing circuitry, network interfaces, peripheral devices, input devices, output devices, sensors, etc. In some embodiments, a circuit takes the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" includes any type of component for accomplishing or facilitating achievement of the operations described herein. In one example, a circuit as described herein includes one or more transistors, logic gates (e.g., NAND, AND, NOR, OR, XOR, NOT, or XNOR), resistors, multiplexers, registers, capacitors, inductors, diodes, wiring, and so on.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, etc. In some embodiments, the one or more processors are external to the apparatus, for example, the one or more processors are a remote processor (e.g., a cloud-based processor). Alternatively, or additionally, the one or more processors are internal and/or local to the apparatus. Accordingly, an exemplary system for implementing the overall system or portions of the embodiments might include general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), etc. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, etc. In some embodiments, the volatile storage media takes the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, a network interface includes cryptography capabilities to establish a secure or relatively secure communication session with other devices in communication with a device that the network interface is provided thereon. Thus, in these arrangements, personal information about the user of the device, financial data, and other types of data is encrypted and transmitted to prevent or substantially prevent the threat of hacking.

In certain embodiments, an "input/output device" as used herein includes hardware and associated logics configured to enable a party to exchange information with a computing device to which the input/output device is connected. In various embodiments, an input aspect of an input/output device allows a user to provide information to the computing device and includes, for example, a touchscreen, a mouse, a keypad, a camera, a scanner, a fingerprint scanner, an eye scanner, a sensor that detects movement, a microphone, a joystick, a user input device engageable to the computing device via a USB, wirelessly, and so on, or any other type of input device capable of being used with a computing device. In various embodiments, an output aspect of an input/output device allows a party to receive information from the computing device and includes, for example, a display, a printer, a speaker, illuminating icons, LEDs, an output device engageable to the computing device via a USB, wirelessly, and so on, or any other type of output device capable of being used with a computing device.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another, or with the two members or the two members and any additional intermediate members being attached to one another. Such joining may be permanent in nature or may be removable or releasable in nature.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein show a specific order and composition of method steps, it is understood that in various embodiments the order of these steps differs from what is depicted. As an example, two or more steps are performed concurrently or with partial concurrence. Also, in various embodiments, some method steps that are performed as discrete steps are combined, steps being performed as a combined step are separated into discrete steps, the sequence of certain processes is reversed or otherwise varied, and/or the nature or number of discrete processes is altered or varied. Furthermore, the order or sequence of any element or apparatus is varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or as acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions can be made to the design, operating conditions and arrangement of the embodiments without departing from the scope of the present disclosure as expressed in the appended claims.

What is claimed is:

1. A lockbox bank comprising:

a lockbox including a weight sensor and a receptacle configured to receive a drop-off; and a terminal of a lockbox computing system comprising:

a processing circuit comprising a processor and a memory, the memory structured to store instructions that are executable by the processor and cause the processing circuit to:

receive a weight of the drop-off from the weight sensor of the lockbox;

determine whether the weight of the drop-off matches an expected weight of the drop-off;

in response to determining that the weight of the drop-off matches the expected weight of the drop-off, move the drop-off from the receptacle of the lockbox to a first secure location; and in response to determining that the weight of the drop-off does not match the expected weight of the drop-off, move the drop-off from the receptacle of the lockbox to a second secure location, wherein the drop-off is moved from the receptacle of the lockbox to one of the first secure location or the second secure location by moving a bottom of the receptacle such that the drop-off falls into the one of the first secure location or the second secure location.

2. The lockbox bank of claim 1, wherein the instructions further cause the processing circuit to:

transmit a notification to a customer indicating whether the weight of the drop-off matches the expected weight.

3. The lockbox bank of claim 2, wherein the instructions further cause the processing circuit to:

receive an indication of a currency amount of the drop-off provided by the customer; and determine the expected weight of the drop-off based on the indication of the currency amount provided by the customer.

4. The lockbox bank of claim 1, wherein the instructions further cause the processing circuit to:

receive a request from a customer to use the lockbox for the drop-off via a drop-off order arranged by the customer with a computing system associated with a provider of financial services.

5. The lockbox bank of claim 1, wherein the instructions further cause the processing circuit to:

receive access credentials from a customer via a near-field communication ("NFC") device of the terminal of the lockbox computing system communicating with a corresponding NFC device of a mobile device associated with the customer.

6. The lockbox bank of claim 1, wherein the instructions further cause the processing circuit to:

receive access credentials from a customer via a keyboard.

7. The lockbox bank of claim 1, wherein the terminal further comprises a payment card reader configured to receive a payment card associated with an account held by a customer, and wherein the instructions further cause the processing circuit to:

receive access credentials from the payment card via the payment card reader.

8. A method comprising:

receiving a weight of a drop-off from a weight sensor of a lockbox, the lockbox comprising the weight sensor and a receptacle configured to receive the drop-off;

determining whether the weight of the drop-off matches an expected weight of the drop-off;

in response to determining that the weight of the drop-off matches the expected weight of the drop-off, moving the drop-off from the receptacle of the lockbox to a first secure location; and in response to determining that the weight of the drop-off does not match the expected weight of the drop-off, move the drop-off from the receptacle of the lockbox to a second secure location, wherein the drop-off is moved from the receptacle of the lockbox to one of the first secure location or the second secure location by moving a bottom of the receptacle such that the drop-off falls into the one of the first secure location or the second secure location.

9. The method of claim 8, wherein the method further comprises:

transmitting a notification to a customer indicating whether the weight of the drop-off matches the expected weight.

10. The method of claim 9, further comprising:

receiving an indication of a currency amount of the drop-off provided by the customer; and determining the expected weight of the drop-off based on the indication of the currency amount provided by the customer.

11. The method of claim 8, further comprising:

receiving a request from a customer to use the lockbox for the drop-off via a drop-off order arranged by the customer with a computing system associated with a provider of financial services.

12. The method of claim 8, wherein a lockbox bank associated with the lockbox comprises a near-field communication ("NFC") device and the method further comprises:

receiving access credentials from a customer by the NFC device communicating with a corresponding NFC device of a mobile device associated with the customer.

13. The method of claim 8, wherein a lockbox bank associated with the lockbox comprises a keyboard and the method further comprises:

receiving access credentials from a customer via the keyboard.

14. The method of claim 8, wherein a lockbox bank associated with the lockbox comprises a payment card device configured to receive a payment card associated with an account held by a customer and the method further comprises:

receiving access credentials from the payment card via the payment card device.

15. A lockbox bank comprising:

a lockbox including a weight sensor and a receptacle configured to receive a drop-off; and a terminal of a lockbox computing system comprising:

a processing circuit comprising a processor and a memory, the memory structured to store instructions that are executable by the processor and cause the processing circuit to:

receive a weight of the drop-off from the weight sensor of the lockbox;

determine whether the weight of the drop-off matches an expected weight of the drop-off;

transmit a notification to a customer indicating whether the weight of the drop-off matches the expected weight;

in response to determining that the weight of the drop-off matches the expected weight of the drop-off, move the drop-off from the receptacle of the lockbox to a first secure location; and in response to determining that the weight of the drop-off does not match the expected weight of the drop-off, move the drop-off from the receptacle of the lockbox to a second secure location, wherein the drop-off is moved from the receptacle of the lockbox to one of the first secure location or the second secure location by moving a bottom of the receptacle such that the drop-off falls into the one of the first secure location or the second secure location.

16. The lockbox bank of claim 15, wherein the instructions further cause the processing circuit to:

receive an indication of a currency amount of the drop-off provided by the customer; and determine the expected weight of the drop-off based on the indication of the currency amount provided by the customer.

17. The lockbox bank of claim 15, wherein the instructions further cause the processing circuit to:

receive access credentials from the customer via a near-field communication ("NFC") device of the terminal of the lockbox computing system communicating with a corresponding NFC device of a mobile device associated with the customer.

18. The lockbox bank of claim 15, wherein the instructions further cause the processing circuit to:

receive access credentials from at least one of the customer via a keyboard or a payment card via a payment card reader.

* * * * *